May 28, 1957     H. M. OLSON     2,793,661
POWER DRIVEN RECIPROCATING SAW UNIT
Filed Oct. 4, 1954     4 Sheets-Sheet 1
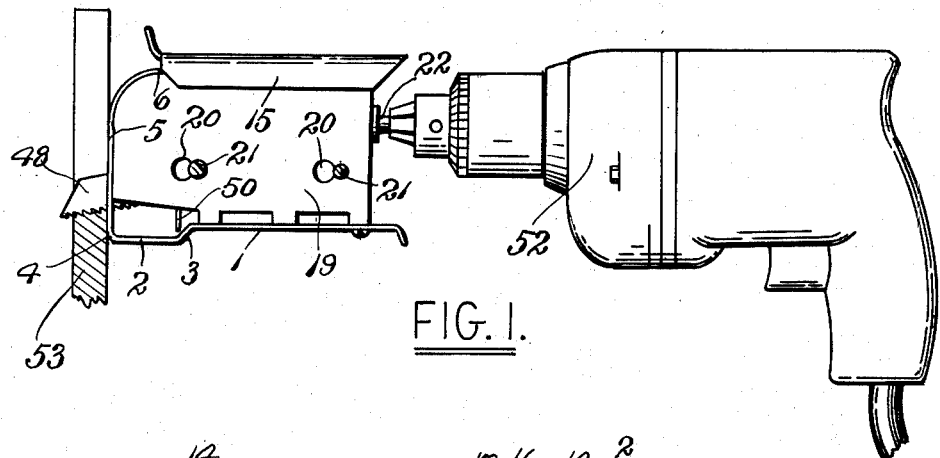
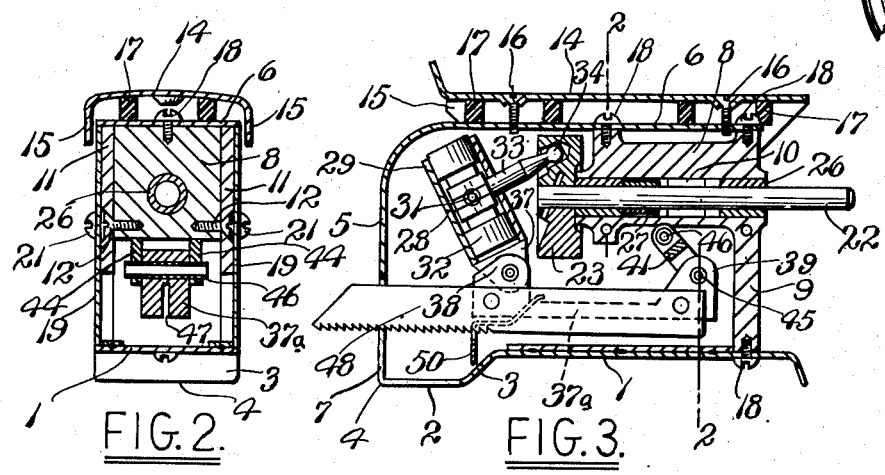
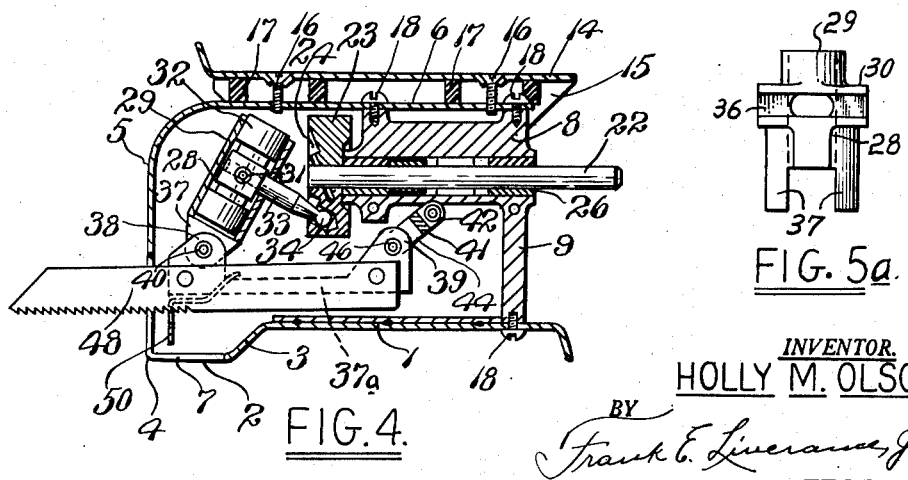
INVENTOR.
HOLLY M. OLSON
BY
Frank E. Liverance, Jr.
ATTORNEY INVENTOR.
HOLLY M. OLSON
BY
Frank E. Liverance, Jr.
ATTORNEY May 28, 1957

H. M. OLSON 2,793,661

POWER DRIVEN RECIPROCATING SAW UNIT

Filed Oct. 4, 1954

INVENTOR.
HOLLY M. OLSON
BY Frank E. Liverance Jr.
ATTORNEY

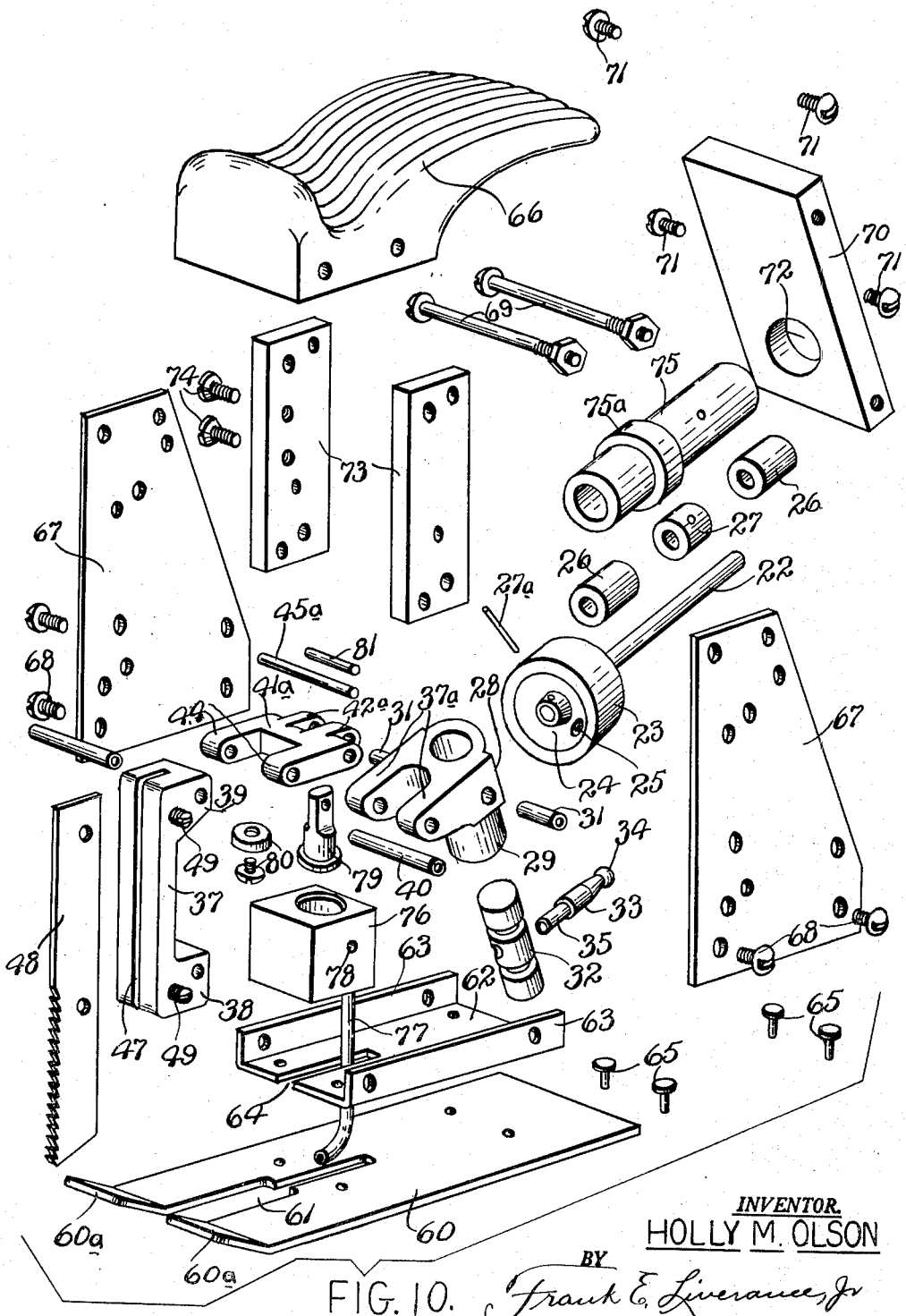

United States Patent Office 2,793,661
Patented May 28, 1957

2,793,661

POWER DRIVEN RECIPROCATING SAW UNIT

Holly M. Olson, Muskegon, Mich.

Application October 4, 1954, Serial No. 460,000

2 Claims. (Cl. 143—68)

This invention relates to a power driven, reciprocating saw unit which in practice is driven by a small motor or equivalent power, the rotary movement imparted by the motor or the like being, through a particularly simple, novel and practical mechanism, changed to a reciprocating movement, the cutting saw being rapidly reciprocated back and forth. Also, instead of the saw moving in a line parallel to its length it is rocked in its reciprocations to a limited extent so that the saw teeth have a general sweeping movement, the teeth in succession after engaging the material which is to be sawed and cutting thereinto moving slightly away from the material so that the sawdust cut by the teeth has ample freedom of movement to pass out of a saw slot or kerf which the saw cuts.

It is an object and purpose of the present invention to provide a saw unit of the character referred to which is generally of small size and weight for ready handling and which, through the driving mechanism between the rotating power drive and the saw, substantially eliminates friction permitting very high speed of operation without appreciable heat generation. Further, through the very practical, simple and effective rocking saw mounting so that a sweeping action is obtained, clogging of the slot or kerf cut with heat generation is avoided and the ability to use a much thinner saw than previously has been used is obtained. With my invention by using a saw having the characteristics of a hack saw, sawing through boards and nails in said boards is easily accomplished.

An understanding of the invention may be had from the following description, taken in connection with the accompanying drawings, in which, Fig. 1 is an elevation showing one form or embodiment of my invention having associated therewith a small electric driving motor.

Fig. 2 is a transverse section therethrough substantially on the plane of line 2—2 of Fig. 3.

Fig. 3 is a generally central longitudinal section through the sawing unit with the saw at one end or extreme of its reciprocation.

Fig. 4 is a like view to that shown in Fig. 3, the saw being at the opposite extreme of its reciprocating movement.

Figs. 5a is a rear elevation of the rocker member of the device shown in the lower left portion in perspective in Fig. 5.

Figure 5:
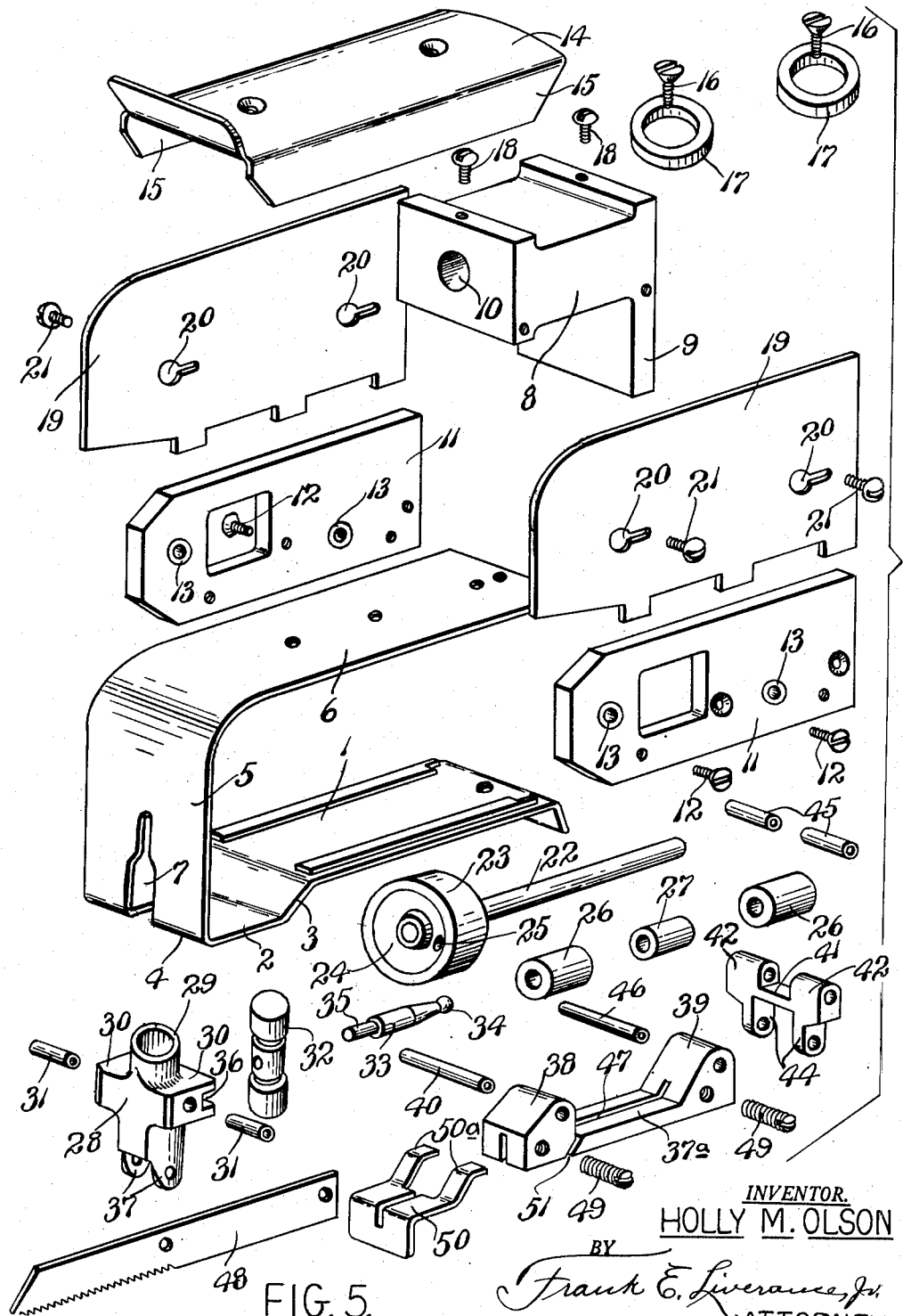
Fig. 5 shows in perspective the parts or elements of the structure, illustrated in Figs. 1 to 4 inclusive, disassembled.
Figure 6:
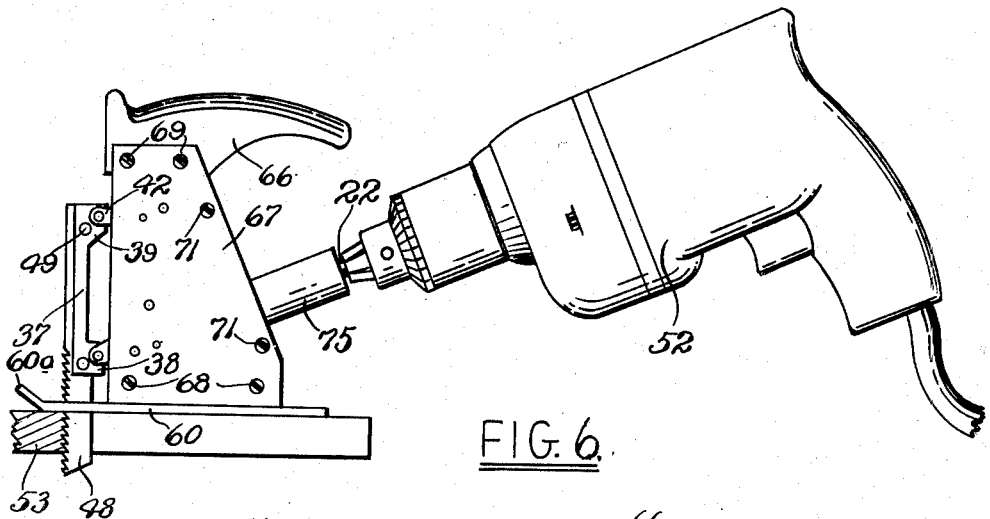
Fig. 6 is a side elevation, similar to Fig. 1, of a second and somewhat specifically different embodiment of my invention.
Figures 7, 8:
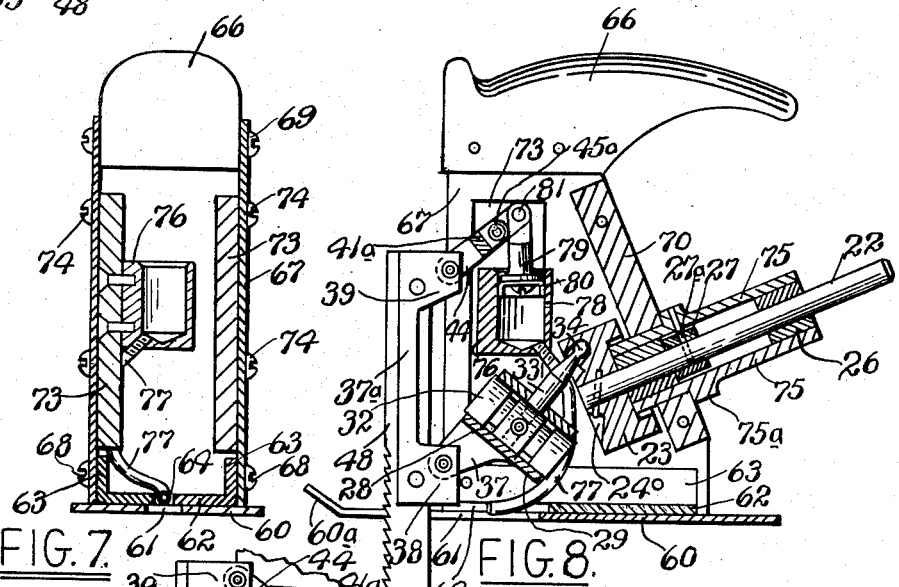
Fig. 7 is a transverse vertical section therethrough similar to Fig. 2 of the first form.
Figure 9:
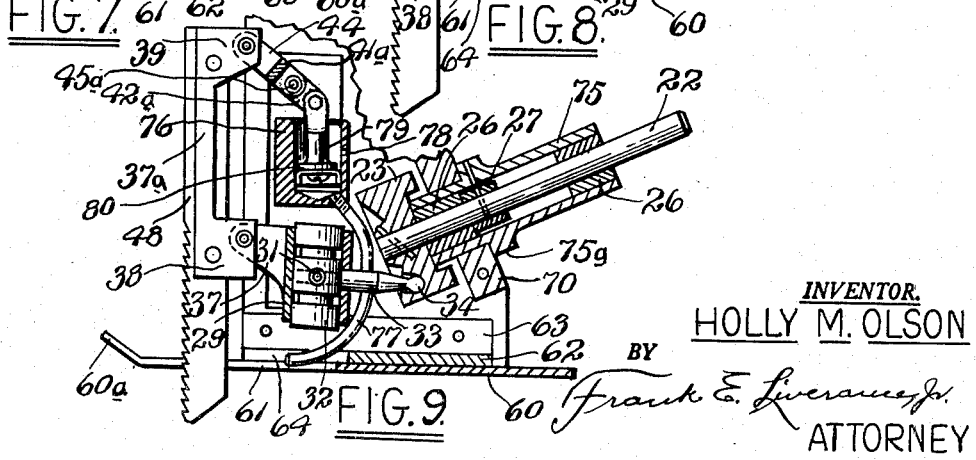

Figs. 8 and 9, similar to Figs. 3 and 4, of the first form, are longitudinal vertical sections illustrating the two extreme positions of the saw in its reciprocations, and Fig. 10, like Fig. 5, shows in perspective the parts or elements of the unit of Figs. 6 to 9 inclusive disassembled.

Like reference characters refer to like parts in the different figures of the drawings.

In the structural form embodying the invention shown in Figs. 1 to 5 inclusive, a housing member, preferably of flat metal, is provided having a horizontal base 1 which at its front end has a short downwardly and forwardly extending section 3 which connects the base 1 with the rear end of a second base section 2 parallel to the base 1 but in a lower plane. From the forward end of the base section 2 the metal is bent in a rounded bend 4 to extend upwardly in a front 5 for a distance and then curved to the rear to provide a terminal horizontal top 6. A slot 7 is cut vertically in the front side 5 extending to the lower base section 2 and such slot extends to the rear for a distance in the section 2.

Between the rear portions of the base 1 and the top housing section 6 a body 8, which may be a suitable die casting of the form shown near the upper portion of Fig. 5, is located, at its rear having an integral downwardly extending back 9. The upper portion of such casting 8 is bored horizontally between its upper and lower sides to provide a continuous cylindrical passage opening 10.

Two spaced side plates 11 are screw connected by screws 12, one at each side of the member 8. Each of the plates 11 carry two spaced apart bearings 13. The bearings in the plates 11 are aligned so as to provide two pairs of horizontal bearings, one toward the front and the other toward the rear. A cover of sheet metal of channel form having an upper side 14 and spaced depending side flanges 15 is at the upper side of the housing being connected by screws 16 passing through the top 14 into the member 8 with, preferably, resilient or rubberlike rings 17 between such top 4 and the upper member 6 of the first described housing structure. Such upper member 6 and the base 1 are also screw connected by screws 18 to such member 8 and the depending back portion 9 thereof.

Two outer side plates of flat metal 19 are located one against the outer side of each of the plates 11 covering them and extending between the upper and lower members 1 and 6 of the housing. Each of the plates 19 may have horizontally aligned keyhole slots 20 for the ready removable connection of the outer plates 19 to the plates 11 using screws 21 threaded into the plates 11, the heads of which pass freely through the larger ends of the keyhole slots. It is not necessary that the plates 19 be removable by the specific structure described as many other forms of detachable connection may be used.

A shaft 22 at its forward end has a cylindrical driving head 23 secured thereto. At its front side the head 23 has an annular groove 24 of the shape shown cut or formed therein, and is also provided with an inclined ball receiving socket 25, one being shown at a distance radially outward from the center of the shaft 22; though it is apparent that additional sockets may be provided at different radial distances from such shaft center. The shaft extends through the cylindrical passage 10 in the member 8, being rotatively mounted in front and rear bearings 26 in said passage with the front bearing between the head 23 and a collar 27 fixed to shaft 22 back thereof within the opening 10 (Figs. 3 and 4).

In front of and spaced from the head 23 is a generally vertical rocker member 28, having a longitudinal cylindrical passage generally vertically therethrough at 29, and with lateral projections 30 between the upper and lower ends which reach to the inner sides of the plates 11. Such member is mounted for rocking movement about a horizontal axis of pins 31 inserted in horizontal openings in the lateral extensions 30 and mounted at their outer ends in the front bearings 13 of the plates 11.

A generally vertical cylindrical member 32 extends downwardly through the cylindrical passage 29 of the rocker member 28. Between its ends at its rear side an arm 33 is secured having a tapered rear extension terminating in a ball 34 and a front reduced extension 35 passing through an axial opening in the cylinder 32. At the rear side of the rocking member 28 and in the lateral extensions 30 a generally horizontal slot 36 is cut, reaching to the interior cylindrical passage through the rocker member 28 so that the member 32 may be rocked about its longitudinal axis by swinging movements of the arm 33, the ball 34 of which is received in the socket 35. At the lower end of the rocker 28 two spaced ears 37 extend downwardly. A generally horizontal saw carrying bar 37a at its front end has an upwardly extending projection 38 and at its rear end a similar projection 39. A pivot pin 40 extends through the upper portion of the projection 38 and at its ends has pivotal mountings in the ears 37.

Adjacent the rear end of the saw carrying bar 37 and the rear projection 38 a link member 41 is located having two upwardly extending spaced ears 42 and two downwardly extending ears 44 (Fig. 5). Pins 45 extending into openings in the ears 42 and at their outer ends are mounted rockingly in the rear bearings 13 of the plates 11. A pivot pin 46 passes through the rear projection 39 of the saw carrier bar 37a and through the downwardly extending ears 44.

The saw carrying bar 37a has a longitudinal slot 47 extending upwardly into the projections 38 and 39. A saw blade 48 located in a vertical plane is inserted upwardly in the slot 47 and is detachably secured in place by screws 49 threading through the end portions of the bar 37a and through suitable openings in the rear portion of the blade 48. Such saw blade extends forwardly through slot 7 beyond the front 5 of the housing and in front of the bar 37a, such front extended portion, at its under edge, being provided with saw teeth as shown. At the front portion of the saw carrying bar 37a and immediately to the rear of the projection 38 a plate 50 of the form best shown at the lower portion of Fig. 5 is attached, the two rearwardly extending arms 50a thereof being received in angularly disposed slots 51 in the bar 37a. The front downwardly extending vertical portion of the member 50 traverses the space between the front 5 and the section 3 of the base of the housing as the saw blade is reciprocated.

Shaft 22 is driven at a high speed of rotation, for example, by a small electric motor 52 or from any other suitable source of power through a flexible shaft; or the electric motor may be fixedly secured to the member 8 and the downward rear extension 9 having its shaft connected to the shaft 22.

In operation, shaft 22 being rotated at high speed the head 23 turning therewith carries the ball 34 in a circular path, the plane of the path of which is perpendicular to the axis of shaft 22 and the center being coincident with the axis of the shaft 22. The arm 33 thereupon rocks the cylinder 32 about pivots 31 and at the same time moves back and forth in the slot 36. The lower end ears 37 of the rocker member 28, pivotally connected to the front projection 38 of the saw carrying bar, move back and forth in an arc of a circle. The link 41 is also caused to simultaneously rock about the axis of the pins 45 and swing in the arc of a circle. The radii of the two arcs, one having a radius extending from the axis of pins 31 to that of pins 40 and the other from that of pins 42 to that of pin 46 are of different lengths. Accordingly, the saw blade 48 does not moves in a horizontal line but is raised and lowered different amounts at the rear and front ends thereof during reciprocating movements. The teeth of the saw cutting a board, as at 53 in Fig. 1, engage the material in succession and with the teeth, successively moving slight distances away from the material after having cut portions therefrom, the sawdust does not pack in and clog between the teeth of the saw but is drawn out of the slot or kerf cut and may pass freely through the slot 7 into the housing on the rear stroke of the saw blade. It will be blown away as plate 50 moves forward rapidly and by such movement forces air ahead and compresses it, causing a gust of air with each forward or outward movement of the saw blade.

While the board at 53 is shown vertically positioned, sawing may be done with the board horizontal, tilting the saw unit in a clockwise direction on the rounded corner 4 of the housing.

In Figs. 6 to 10 inclusive, another specific form embodying the same invention is shown. The housing for the mechanism includes a lower horizontal flat bottom plate 60 slotted at 61 in its front end portion, with upturned inclined lips 60a at the front ends of the plate. A channel member having a horizontal web 62 and vertical side flanges 63 is disposed over the rear portion of the plate 60, with a slot 64 in the web 62 located over the narrower rear portion of the slot 61. Such channel member is permanently secured to the plate 60 by rivets 65.

The upper or top handle member 66 of the housing, of the form shown best in Fig. 10, is located a distance above the base plate 60. Between it and such plate 60, flat vertical side plates 67 spaced from each other are provided connected by screws 68 at their lower ends to the webs 63 and by bolts 69 to the upper handle member 66. At the back a heavy rectangular plate 70 is located, inclining upwardly from its lower end. It is disposed between the rear edge portions of the plate 67 and screw connected thereto by screws 71. Such back plate 70 has an opening 72, circular in outline, through its lower portion. At the inner side of each plate 67 a relatively heavy vertical plate 73 is secured by screws 74.

A sleeve 75 extends through the opening 72 until an annular collar 75a thereon comes against the outer side of the rear plate 70. Such sleeve provides a carrier for the bearings 26 and collar 27 which, like in the first structure described, rotatively mount shaft 22 with its head 23 at its forward end. The collar 27 is secured to the shaft 22 by a pin 27a. Shaft 22 inclines upwardly and to the rear as shown in Figs. 8 and 9. The rocker member 28 having cylinder 29 to receive the cylindrical member 32 lengthwise therein is mounted for rocking movements on pivots or trunnions 31 the same as in the first structure pivots 31 are carried by the plates 11. The cylindrical member 32 within the cylinder 29 is connected by arm 33 with the head 23 the same as in the first described structure. The ears 37 extending from the rocker member 28 in the second form are in a forward direction therefrom instead of downwardly at the lower end, and are pivotally connected to the lower projection 38 of vertical saw blade carrying bar 37a. The saw 48 carried by said bar 37a is in a generally vertical position.

The upper end projection 39 of bar 37a has a pivotal connection to arms 44 of a rocker link 41a similar to the rocker link 41 of the first structure. It is pivotally mounted to rock on a pin 45a the ends of which are carried by the plates 73. Lugs 42a project rearwardly beyond the pivot 45a over the upper end of a cylinder 76 open at its upper end and closed at its lower end, and secured at the inner side of the adjacent plate 73. An air carrying tube 77 is connected with the bottom of the cylinder 76 and leads downwardly so that its free end portion is in the slots 64 and 61. The wall of the cylinder at one side has an air passage 78. The arms 42a are pivotally connected to the upper end of a piston rod 79 which extends downwardly into cylinder 76 having a cup leather piston 80 at its lower end within the cylinder.

The shaft 22 is driven in the same manner as previously described by a small electric motor 52 which may be connected in the manner shown in Fig. 6, or the motor may be fastened directly to the rear plate 70 of the housing in which case the rear handle portion of the top housing member 66 is eliminated. As shown in Fig. 6, the vertical saw blade, which extends downwardly through the slot 61, is reciprocated and rocked to have a like sweeping motion as in the first described structure. With each complete reciprocation of the saw blade the piston 80 is raised and lowered in its cylinder 76. In its upper position it is above the opening 78 in the cylinder wall but on its downstroke almost instantly covers opening 76, thus air is forced under pressure through the tube 77. By reason of such structure a continuous succession of jets of air are projected from the lower end of the tube 77 with each upward reciprocatory movement of the saw blade 48 and corresponding downward movement of the piston 80. Sawdust is blown away by the jets of air.

The structures described, both of which have been built and extensively tested, are exceptionally satisfactory in operation. The rotation of the shaft 76 may be maintained for an indefinite time at very high speeds without development of heat, there being no losses of power or energy through heat development as friction is reduced to a minimum. The novel connection between the rotating shaft 22 and the reciprocating saw carrying bar provides this in a most satisfactory manner. Also there is no danger of interference with the operation of the machine through clogging of parts by reason of excessive lubricant required and the collection of sawdust by such lubricant. The movement of the saw blade 48, identical in both structures which has been denoted as a rocking sweeping movement, insures that the sawdust will be cleared of the teeth of the saw, will not pack therein but have freedom for escape so that heating of the saw and the material cut thereby is avoided. The saw blade also may be of thinner material than has previously been needed. With a proper blade of the hack saw type, sawing through boards which have nails in them, which the saw comes to, is easily accomplished. It is apparent that the saw teeth cut on the upward movement of the saw 48 and because of the mounting of the saw, through bar 27a, on pivotal arms 37 and 44, on such upward movement the saw is pushed toward and into the work sawed from the beginning of such upward movement, starting with the parts in the position shown in Fig. 8 until substantially the completion thereof. On the downward movement the saw is drawn back moving opposite to its pushing into the work sawed on its upward movement. Such upward and outward movements and downward and inward movements are, so far as the saw teeth which directly engage the work processed are concerned, aided and increased by the rocking action of the different length arms 37 and 44. Thus, in each complete reciprocation of the saw 48 (Figs. 8 and 9), after cutting, the saw teeth automatically back away from the board cut, avoiding saw dust clogging, friction and heat, whereby a much more rapid and effective sawing is accomplished.

The invention is defined in the appended claims and is to be considered comprehensive of all forms of structure coming within their scope.

I claim:

1. Mechanism as described comprising, a support, a shaft rotatably mounted thereon, a head at the inner end of said shaft having a socket in the inner face thereof directed radially outward from the axis of said shaft, a cylindrical rocker member mounted on said support for rocking movement on an axis transverse to the axis of said shaft located adjacent said head, a cylindrical member within and lengthwise of said rocker member, rotatable about an axis perpendicular to the axis of rocking of said rocker member, said rocker member at its side adjacent said head having a transverse slot therein, an arm secured at one end to said cylindrical member passing through said slot and having its other end in said socket, ears connected with and extending from said rocker member, a saw carrying elongated bar pivotally connected at one end to said ears, and link means pivotally mounted on said support pivotally connected to the other end of said bar.

2. Mechanism as described comprising, a support having spaced vertical sides, a rocker member between said vertical sides mounted thereon between its ends for rocking movement about a horizontal axis, said rocker member having a cylindrical passage lengthwise thereof and a transverse slot therein between its ends in the plane of the axis of rocking of said rocker member, a cylindrical member within the passage in said rocker member, an arm secured at one end to said cylindrical member extending through said slot, and rotating means operatively associated with the other end of said arm for moving said other end of said arm in a circular path of movement in a plane perpendicular to the rotative axis of movement of said rotating means.

References Cited in the file of this patent

UNITED STATES PATENTS

| | | |
|---|---|---|
| 10,366 | Helton | Jan. 3, 1854 |
| 105,120 | Ogden | July 5, 1870 |
| 207,640 | Barnes | Sept. 3, 1878 |
| 212,621 | Patric | Feb. 25, 1879 |
| 215,468 | Legros | May 20, 1879 |
| 1,438,645 | Hill | Dec. 12, 1922 |
| 1,505,030 | Kentch | Aug. 12, 1924 |
| 1,542,127 | Hastings | June 16, 1925 |
| 1,564,105 | Quellet | Dec. 1, 1925 |
| 2,116,123 | Ocenasek | May 3, 1938 |
| 2,501,631 | Oschwald | Mar. 21, 1950 |
| 2,692,621 | Steiner | Oct. 26, 1954 |
| 2,704,941 | Holford | Mar. 29, 1955 |